United States Patent
Johnson et al.

(10) Patent No.: US 7,882,319 B2
(45) Date of Patent: Feb. 1, 2011

(54) METHOD AND SYSTEM FOR MEMORY MANAGEMENT

(75) Inventors: Darrin P. Johnson, San Jose, CA (US); Eric C. Saxe, Livermore, CA (US); Sherry Q. Moore, Fremont, CA (US)

(73) Assignee: Oracle America Inc., Redwood City, CA (US)

(*) Notice: Subject to any disclaimer, the term of this patent is extended or adjusted under 35 U.S.C. 154(b) by 684 days.

(21) Appl. No.: 11/863,160

(22) Filed: Sep. 27, 2007

(65) Prior Publication Data

US 2009/0089531 A1    Apr. 2, 2009

(51) Int. Cl.
G06F 13/00    (2006.01)
G06F 13/28    (2006.01)

(52) U.S. Cl. ............ 711/165; 711/170; 711/173; 711/E12.041

(58) Field of Classification Search ............ None
See application file for complete search history.

(56) References Cited

U.S. PATENT DOCUMENTS 7,702,940 B2 *   4/2010   Van Gassel et al. ......... 713/324
2004/0148481 A1 * 7/2004   Gupta ...................... 711/165

* cited by examiner

*Primary Examiner*—Reginald G Bragdon
*Assistant Examiner*—Eric S Cardwell
(74) *Attorney, Agent, or Firm*—Osha • Liang LLP (57) ABSTRACT

A method for memory management that includes receiving a request for memory space, identifying a first memory module from a plurality of memory modules based on a first memory power management policy, wherein the first memory power management policy specifies how to allocate memory space in the plurality of memory modules to satisfy a power consumption criteria, and allocating the memory space on the first memory module.

12 Claims, 6 Drawing Sheets

METHOD AND SYSTEM FOR MEMORY MANAGEMENT

BACKGROUND

A modern computer system may be divided roughly into three conceptual elements: the hardware, the operating system, and the application programs. The hardware, e.g., the central processing unit (CPU), the memory, the persistent storage devices, and the input/output devices, provides the basic computing resources. The application programs, such as compilers, database systems, software, and business programs, define the ways in which these resources are used to solve the computing problems of the users. The users may include people, machines, and other computers that use the application programs, which in turn employ the hardware, to solve numerous types of problems.

An operating system ("OS") is a program that acts as an intermediary between a user of a computer system and the computer hardware. The purpose of an operating system is to provide an environment in which a user can execute application programs in a convenient and efficient manner. A computer system has many resources (hardware and software) that may be required to solve a problem, e.g., central processing unit ("CPU") time, memory space, file storage space, input/output ("I/O") devices, etc. The operating system acts as a manager of these resources and allocates them to specific programs and users as necessary. Because there may be many, possibly conflicting, requests for resources, the operating system must decide which requests are allocated resources to operate the computer system efficiently and fairly.

Moreover, an operating system may be characterized as a control program. The control program controls the execution of user programs to prevent errors and improper use of the computer. It is especially concerned with the operation of I/O devices. In general, operating systems exist because they are a reasonable way to solve the problem of creating a usable computing system. The fundamental goal of a computer system is to execute user programs and make solving user problems easier. Toward this goal, computer hardware is constructed. Because bare hardware alone is not particularly easy to use, application programs are developed. These various programs require certain common operations, such as those controlling the I/O operations. The common functions of controlling and allocating resources are then brought together into one piece of software: the operating system.

In order to conserve energy, some computer systems incorporate power control mechanisms. For example, Energy Star ("E*") power requirements require system power consumption to be lowered to 15% of the normal operating power consumption level when the system is idle. In order to conserve power, the operating system turns off, reduces the operating frequency or voltage of, or employs otherwise device specific mechanisms for reducing consumed power of inactive and/or underutilized components, such as hard disks and monitors. The operating system may also conserve power by adjusting the execution of the CPU.

SUMMARY

In general, in one aspect, the invention relates to a method for memory management that includes receiving a request for memory space, identifying a first memory module from a plurality of memory modules based on a first memory power management policy, wherein the first memory power management policy specifies how to allocate memory space in the plurality of memory modules to satisfy a power consumption criteria, and allocating the memory space on the first memory module.

In general, in one aspect, the invention relates to a system for memory management that includes a plurality of memory modules, and a page allocator configured to receive a request for memory space, identify a first memory module from the plurality of memory modules based on a first memory power management policy, wherein the first memory power management policy specifies how to allocate memory space in the plurality of memory modules to satisfy a power consumption criteria, and allocate the memory space on the first memory module.

In general, in one aspect, the invention relates to a computer readable medium comprising computer readable program code embodied therein for causing a computer system to receive a request for memory space, identify a first memory module from a plurality of memory modules based on a first memory power management policy, wherein the first memory power management policy specifies how to allocate memory space in the plurality of memory modules to satisfy a power consumption criteria, and allocate the memory space on the first memory module.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for memory management. Specifically, embodiments of the invention account for power conservation and performance when allocating space in memory. For example, when desiring to conserve power, embodiments of the invention may group allocated space on fewer memory modules (described below) and power down the remaining memory modules. Conversely, when desiring to ensure greater performance, embodiments of the invention may distribute the allocation of memory across all (or a large number of) memory modules.

Figure 1:
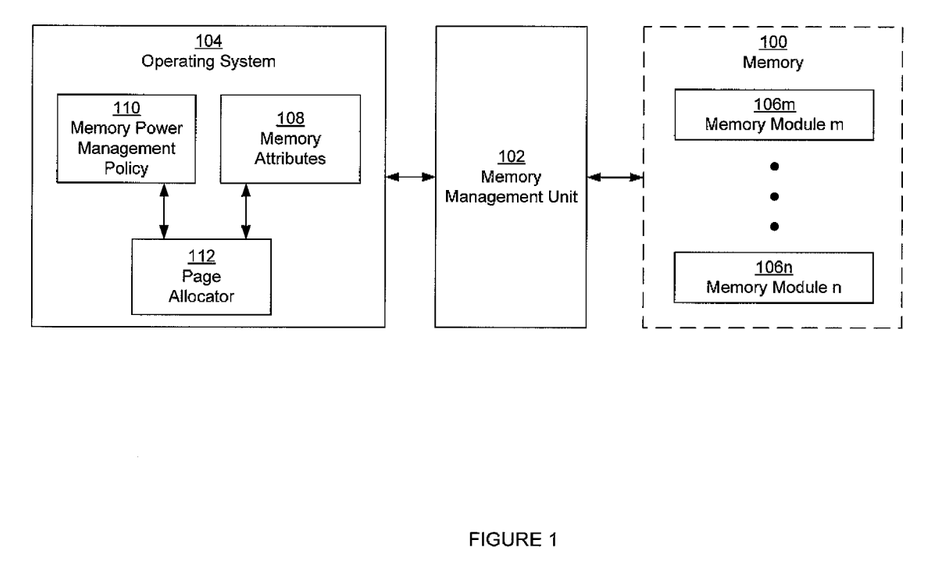
FIG. 1 shows a schematic diagram of a system in accordance with one or more embodiments of the invention.

FIG. 1 shows a schematic diagram of a system in accordance with one or more embodiments of the invention. As shown in FIG. 1, the system includes memory (100), a memory management unit (102), and an operating system (104) in accordance with one or more embodiments of the invention. Each of these components is described below.

Memory (100) is any type of hardware device configured to store data. The memory (100) may be volatile storage, persistent storage, or a combination thereof. In one or more embodiments of the invention, the memory (100) is random access memory (RAM). As shown in FIG. 1, the memory (100) is composed of memory modules (106M, 106N). The memory module (106M, 106N) is a discrete configuration of memory (100). Specifically, each memory module (106M, 106N) may be managed separately from other memory modules (106M, 106N). In one or more embodiments of the invention, the memory modules (106M, 106N) are of a homogenous type. For example, the type of memory module (106M, 106N) may be dual in-line memory module (DIMM), a flash memory, or any other discrete configuration of memory (100). Alternatively, the memory (100) may include different types of memory modules (106M, 106N).

In one embodiment of the invention, each memory module (106M, 106N) has a power state. The power state defines the power consumption of (or power provided to) the memory module (106M, 106N). For example, the power states may include enabled, disabled, standby, read-only etc. In this scenario, a disabled memory module (106M, 106N), or a memory module (106M, 106N) in a disabled power state, is not operating and subsequently is not using power in accordance with one or more embodiments of the invention. Further, when the memory module is in standby state, the memory module (106M, 106N) is consuming a low level of power.

In one embodiment of the invention, one or more memory modules (106M, 106N) may support multiple power states, where each power state is associated with a specific level of performance. For example, at level 1 the memory module may be disabled, at level 2 the memory module may be using 50% of the maximum power consumption and operate at 40-60% of the maximum performance, and at level 3 the memory module may be using 100% of the maximum power consumption and operate at 100% of the maximum performance.

Further, memory may be grouped into a memory bank. In such scenario, each memory module in the same memory bank may be equally managed while memory modules in different memory banks are separately managed. Further, memory modules in the same memory bank may have the same power state.

Additionally, in one or more embodiments of the invention, memory is arranged in a hierarchy. In the hierarchy, memory close to the processor may be closer to the root node in the hierarchy than memory farther from the processor In such scenario, changing the memory power states of memory corresponding the leaf nodes (i.e., memory farther from the processor) may be given greater preference as the performance degradation may be less than the memory corresponding to the root node.

Continuing with the discussion of FIG. 1, processes (not shown), such as those created by executing an application program (not shown) and/or operating system (104), executing on the system are allocated space in the form of page(s) (not shown) in memory (100). A page is a discrete unit of space in memory (100) that may be used for storage. The collection of pages on a memory module create a partition of the memory module. A page may be fixed or variable size. A process may store and access data in the page(s) allocated to the process. The allocation of pages to a process may result in processes being assigned non-adjacent pages.

Furthermore, for the purpose of the description and claims, a page may also be a memory object without departing from the scope of the invention. A memory object may be of variable size and may be managed as a whole.

In order to access a specific unit of data in a page, a physical address (not shown) may be used. The physical address specifies the memory module (106M, 106N) and a location within the memory module. The range of valid physical addresses in memory is the physical address space.

However, rather than requiring processes to keep track of the available memory using physical addresses, the computer system allows processes to request data in memory (100) using virtual addresses defined in a virtual address space. The virtual address space provides a process with a continuous view of memory (100). Thus, processes do not necessarily need to be aware of the physical layout of memory (100), such as the location of data on the memory modules (106M, 106N).

In one or more embodiments of the invention, the system includes a memory management unit (MMU) (102). A memory management unit (MMU) (102) includes functionality to perform a translation from the virtual address provided by the process to a physical address required to access data in memory (100). The MMU (102) identifies the physical address of the data in the page of memory from the virtual address. The MMU (102) may identify the physical address using any of the variety of mechanisms known in the art, such as a translation lookaside buffer (TLB), page table, and/or another type of table. When the physical address cannot be identified by the MMU, the MMW generates a page fault. The page fault results in a notification to the operating system (104) (described below) that a new page of memory needs to be allocated.

While FIG. 1 has a MMU (102), those skilled in the art will appreciate that the system may not include an MMU (102). Specifically, the functionality performed by the MMU may be performed by one or more other components of the system. FIG. 1 shows one type of hardware configuration. Alternative configurations may also be used without departing from the scope of the invention.

In one embodiment of the invention, the operating system (104) is a program that acts as an intermediary between a user of a computer system and the computer hardware. Specifically, the operating system (104) is a software component that manages core functions of the computer system in accordance with one or more embodiments of the invention. The operating system (104) includes memory attributes (108), a memory power management policy (110), and a page allocator (112). Each of these components is described below.

In one or more embodiments of the invention, memory attributes (108) include current and historical performance attributes of memory (100). For example, in one or more embodiments of the invention, memory attributes (108) may include latency to access memory (100), throughput, total capacity of memory (100), available capacity of memory (100), the amount of available space in memory (100), whether memory (100) is interleaved or not, the power consumption by memory (100) as a whole and/or power consumption for each of the memory modules (106M, 106N), the layout of the memory modules (106M, 106N), number of page faults, etc.

The memory power management policy (110) is a description of how memory should be allocated to enforce a desired power consumption level of memory (100). Said another way, memory power management policy specifies how to allocate memory space in the memory to satisfy a power consumption criteria. More specifically, the memory power management policy (110) governs how memory (100) is allocated and which memory modules (106M, 106N) are enabled in order to balance power conservation with minimum performance requirements.

For example, the memory power management policy (110) may specify that only a certain number of memory modules (106M, 106N) are enabled or may identify specific memory modules (106M, 106N) to enabled. The memory power management policy (110) may also specify minimal current memory attributes in order to assure that a minimal performance level is maintained. The minimal current memory attributes stored in the memory power management policy may be collectively referred to as performance criteria.

In one or more embodiments of the invention, multiple memory power management policies exist. Each memory power management policy (110) may have an attribute that identifies when the memory power management policy (110) governs memory allocation. For example, one memory power management policy may be implemented when the computer system is operating on battery power, while another memory power management policy may be implemented when the computer system is using a wall outlet.

Alternatively, a schedule (not shown) may be used to define when a particular memory power management policy (110) governs memory allocation. For example, the scheduler may specify one memory power management policy that conserves power to be used at a certain time of day (e.g., between 9:00 pm-6:00 am) and another memory power management policy that optimizes performance (though not necessarily power consumption) to be used at another time of day (e.g., between 6:01 am-8:59 pm).

In another alternative, computer system usage attributes, or attributes characterizing how the computer system currently is used, may also define which memory power management policy governs. For example, if all processes executing are kernel-level processes, then a memory power management policy that conserves energy may be used. In contrast, in the example, if many of the processes executing are application program processes (e.g., a user is actively using the computer system), then a memory power management policy that ensures greater performance may be used.

In one or more embodiments of the invention, each memory power management policy (110) has a corresponding Mstate (not shown). In particular, an Mstate is an identifier of the memory power management policy (110). Specifically, the Mstate may specify a level of power to performance tradeoff for memory, such as the frequency and voltage of the memory modules in accordance with one or more embodiments of the invention. Different Mstates may have different levels of tradeoff. The Mstate may be used to specify and identify which memory power management policy (110) is currently being applied (or which memory power management policy to apply (110)).

In one or more embodiments of the invention, the memory power management policy (110) is operatively connected to a page allocator (112). The F page allocator (112) includes functionality to allocate space in memory (100) to processes. Specifically, the page allocator (112) includes functionality to identify the current memory power management policy, and allocate space in memory according to the current memory power management policy (110) and memory attributes (108) in accordance with one or more embodiments of the invention.

Figure 2:
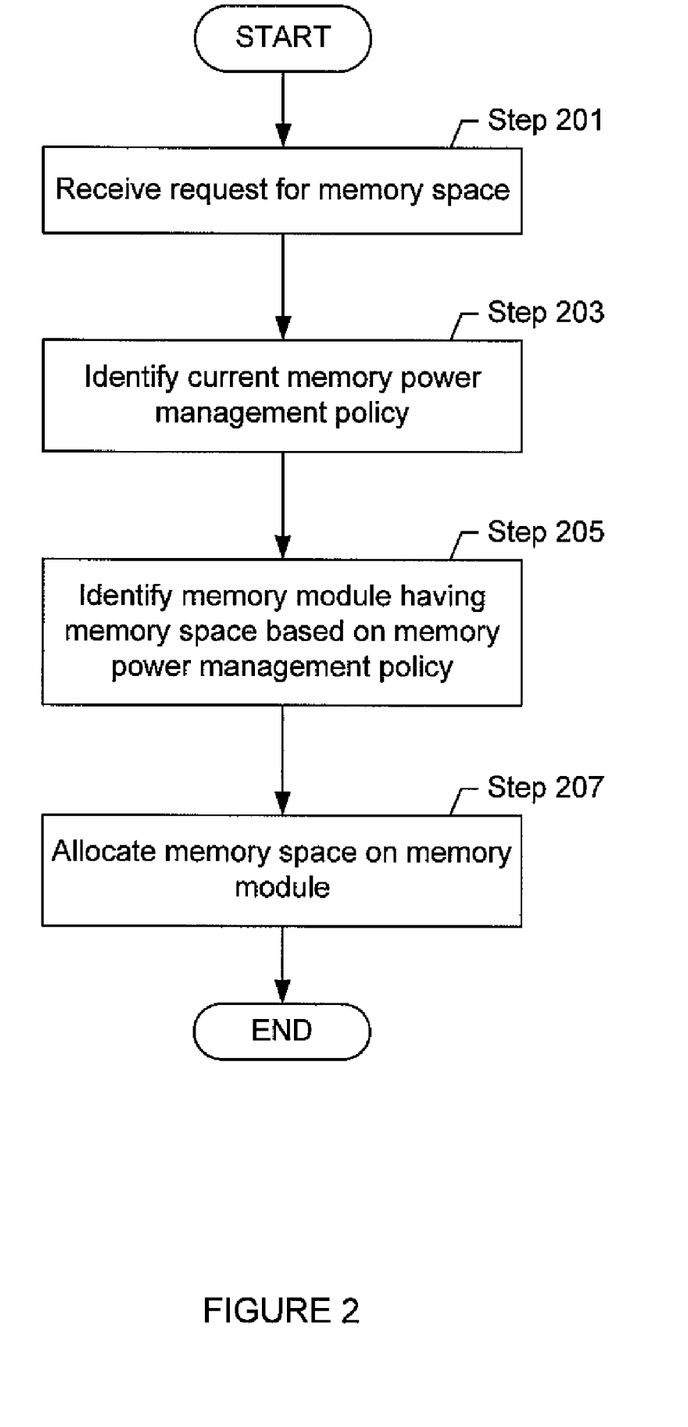
FIGS. 2-3 show flowcharts of methods in accordance with one or more embodiments of the invention.
Figure 3:
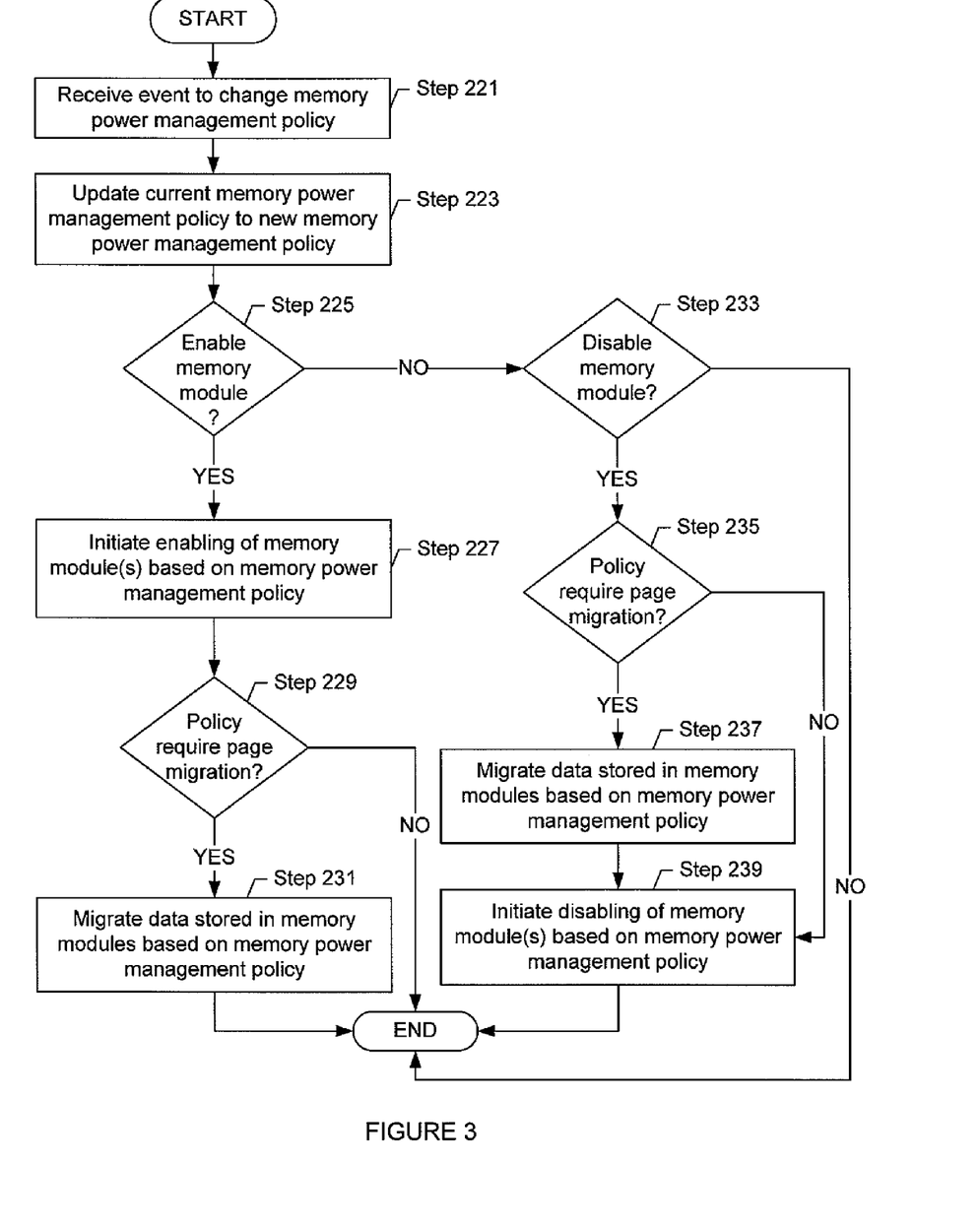

FIGS. 2-3 show flowcharts of methods in accordance with one or more embodiments of the invention. While the various steps in this flowchart are presented and described sequentially, one of ordinary skill will appreciate that some or all of the steps may be executed in different orders and some or all of the steps may be executed in parallel.

FIG. 2 shows a flowchart of a method to allocate space in memory in accordance with one or more embodiments of the invention. Initially, a request for memory space is received (Step 201). Typically, the request for memory space is received when a page fault occurs. Specifically, the MMU may generate a page fault when a process requests a data that is not in physical memory.

The page fault is handled by the page allocator in accordance with one or more embodiments of the invention. Specifically, in one or more embodiments of the invention, the page allocator identifies the current memory power management policy (Step 203). The page allocator may identify the current memory power management policy, for example, by accessing an Mstate variable. The value of the Mstate variable specifies which memory power management policy is being applied.

After identifying the memory power management policy, the page allocator identifies the memory module having memory space based on the memory power management policy (Step 205). In particular, in one or more embodiments of the invention, certain memory modules may be disabled while other memory modules are enabled. The aforementioned information about the memory may be obtained from the memory attributes (108). The page allocator may identify the page(s) of memory on the enabled memory modules that is available.

If no available space in memory exists, the page allocator may determine that a page of memory should be replaced with data for which the space is requested. In one or more embodiments of the invention, the page allocator may use any page replacement algorithm known in the art, such as first in, first out, least recently used, etc. Furthermore, the page replacement algorithm may be selected based on the memory power management policy. For example, when most or all of the memory modules are available, then the page allocator may allocate pages in a random, round robin, or otherwise distributed fashion across the modules to increase available bandwidth and/or reduce memory access latencies. In another example, when fewer memory modules are used and space is freed in memory, the page allocator may coalesce memory in order to defragment allocated memory, and maximize availability of underutilized modules that may be power managed.

Alternatively, the page allocator may detect, using the memory attributes, that amount of memory in use does not lend itself to the performance requirements specified by the memory power management policy. In such scenarios, the page allocator may request that a resource broker (or agent) enables or sets on standby one or more additional memory modules. For example, the page allocator, or other agent, may determine the number of available memory modules provides insufficient bandwidth to sustain minimum performance levels specified by the current memory power management policy. Accordingly, the page allocator may request that additional memory modules are enabled.

In another alternative, the page allocator may determine that the performance of the computer system exceeds the performance requirements, while the power consumption by the memory modules exceeds the memory power management policy. In such scenario, the page allocator may disable certain memory modules, for example, through a resource broker or agent.

Rather than the page allocator periodically checking the memory attributes to determine whether the performance and power requirements are complied with, an event may be triggered when the memory attributes do not comply with the performance requirements. Specifically, when the memory attributes are updated, a determination may be made whether the memory attributes comply with the current memory power management policy. If the memory attributes do not comply with the memory power management policy, then the operating system may be notified via an event (or other notification mechanism). The event may be triggered, for example, by the page allocator or performance monitoring hardware or software that is triggered when utilization or measured bandwidth exceeds a threshold.

Continuing with FIG. 2, the page allocator allocates space on the identified memory module in accordance with one or more embodiments of the invention (Step 207). Specifically, the space in memory is allocated and subsequently populated with data for the process. In addition, tables used by the MMU may be updated with the virtual address to physical address mapping for the space.

FIG. 3 shows a flowchart of a method for memory management when the memory power management policy is updated in accordance with one or more embodiments of the invention. Initially, an event to change memory power management policy is received in accordance with one or more embodiments of the invention (Step 221). Various mechanisms may be employed to trigger the event to change the memory power management policy. For example, the system may switch to battery power from being plugged into a wall outlet. In another example, the computer system may detect that computer usage exceeds a certain limit and the system should not conserve power. In another alternative, the schedule and time may result in the triggering of an event for changing the memory power management policy. Furthermore, using a user interface, an administrator or other individual may request that the system conserve power. As part of the power conservation, the system may change the power management policy.

One mechanism to change the power management policy is to change the value of the Mstate variable. Specifically, any of the mechanisms discussed above to trigger the change in the memory power management policy may update the value of the Mstate variable to a new value representing the new memory power management policy. Accordingly, the current memory power management policy is updated to the new memory power management policy (Step 223). Updating the current memory power management policy may require changing the power mode of a memory module and/or migrating pages in accordance with one or more embodiments of the invention.

In one or more embodiments of the invention, a determination is made about whether to enable one or more memory modules based on the updated memory power management policy (Step 225). The determination may be made to enable additional memory modules when the memory power management policy explicitly or implicitly specifies that greater performance should be achieved at the expense of power. For example, the memory power management policy may specify the number of memory modules that should be enabled, which memory modules should be enabled, and/or a performance requirement that cannot be achieved with the current number of enabled memory modules.

If a determination is made to enable memory modules, then enabling the memory module(s) is initiated based on the memory power management policy (Step 227). For example, the page allocator may trigger the resource broker to begin providing power to the memory module(s). Alternatively, the page allocator may request that the resource broker set the memory module(s) on standby. When the memory module(s) are on standby, the page allocator may begin allocating space on the memory module by fully enabling the memory module.

Further, a determination is made whether the memory power management policy requires page migration (Step 229). The memory power management policy may require page migration, for example, when immediate change in performance is desired. For example, the memory power management policy may require that pages of memory are immediately interleaved. In such scenario, the page allocator migrates data stored in the memory modules based on the memory power management policy. Such data migration could potentially cause degradation when the migration is in progress, but performance will improve once the migration is completed and the new memory module is available.

Alternatively, the memory power management policy may not require page migration. For example, the pages of memory may be allocated so as to have increased performance over time. For example, the pages of memory may be allocated over the course of several page faults and the new memory space provided by the additional modules allocated.

If migration is required, then data stored in the memory modules is migrated (typically on a per-page basis) based on the memory power management policy (Step 231). Page migration may be performed, for example, using virtually any technique known in the art.

Rather than or in addition to requiring that memory modules are enabled, a determination may be made whether one or more memory modules should be disabled (Step 233). A memory module should be disabled, for example, if the memory power management policy specifies a power level that cannot be achieved with the additional memory module or if the memory power management policy specifies a number of memory modules less than the number currently enabled.

At this stage, a determination may also be made whether the performance requirements specified by the memory power management policy can be achieved with the fewer memory modules. For example, the performance requirement may specify a maximum amount of degradation of performance caused by insufficient bandwidth from accessing fewer memory modules. If the determination is made that memory accesses to the fewer memory modules would result in the maximum amount of performance degradation being exceeded, then the determination may be made not to disable a memory module.

Choosing the memory module(s) that should be disabled may be based on various criteria, such as the amount of space allocation on each memory module, the power consumption requirements of the memory module, the amount of fragmentation occurring on each memory module, the median time from when pages of the memory module were last accessed, which pages are most frequently accessed (i.e., memory bandwidth utilization by a memory module), etc.

Continuing with FIG. 3, a determination may also be made whether the memory power management policy requires page migration (Step 235). For example, rather than requiring the pages of memory to be reloaded, a determination may be made to migrate pages from memory module to another. The migration of pages in memory may cause fewer page faults to occur.

If a determination is made to migrate pages of memory, then data stored in the memory modules are migrated based on the memory power management policy (Step 237). At this stage, the memory modules that are to remain enabled may be coalesced in order to create larger pages of available memory.

The page on the memory modules that are to be disabled are subsequently copied to the memory modules that are to remain enabled.

Regardless of whether a determination is made to migrate pages, if a determination is made to disable memory modules, then the disabling of memory modules based on the memory power management policy is performed (Step 239). Disabling the memory modules may be performed in a manner similar to enabling the memory modules (described above in Step 227). Specifically, the page allocator may instruct the resource broker to disable memory modules. In response, the resource broker may block the power supply to the disabled memory modules. As discussed above, disabled memory modules may be re-enabled, for example, when the performance requirements are not achieved with the currently enabled memory modules.

Figure 4A:
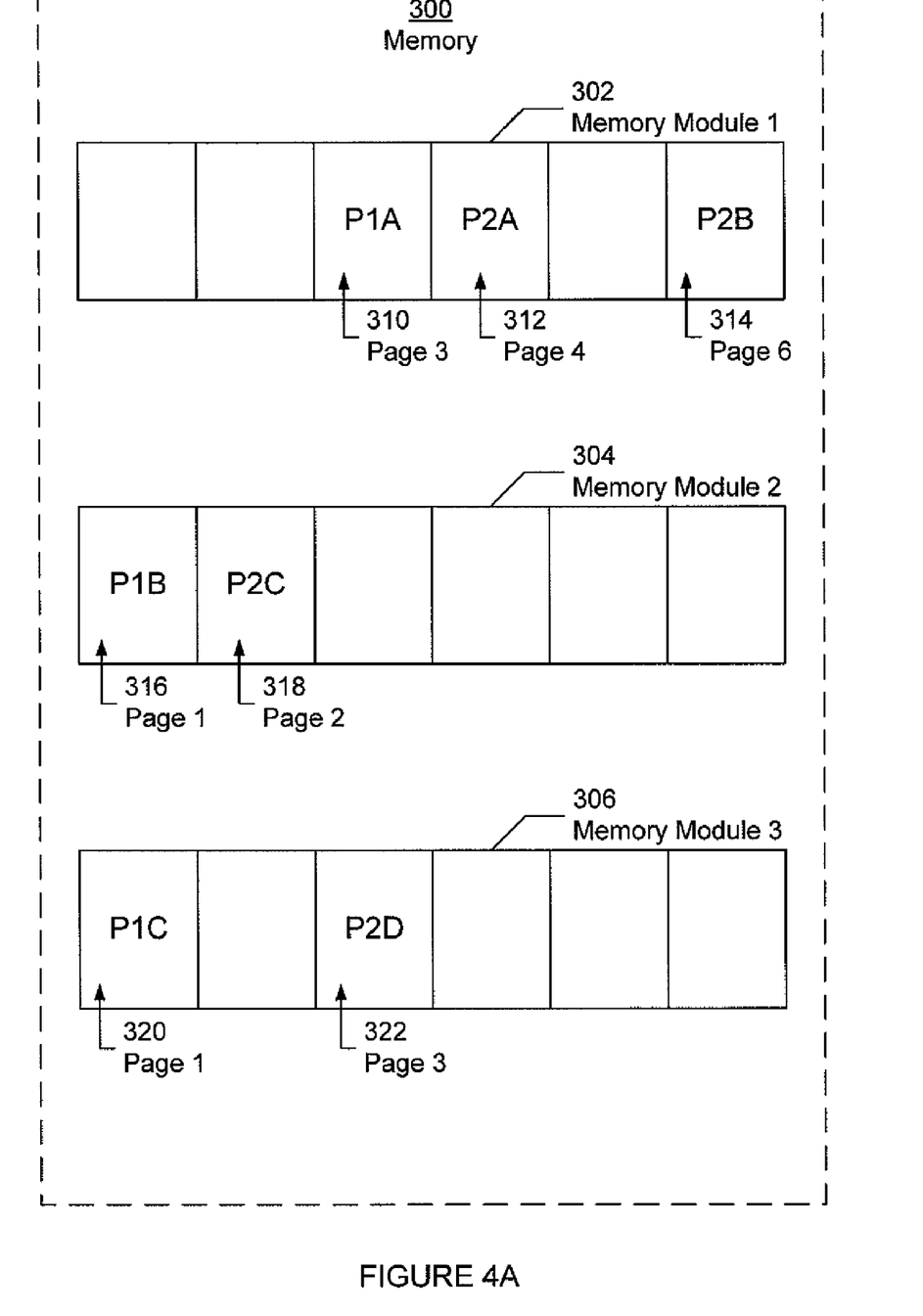
FIGS. 4A-4B show examples in accordance with one or more embodiments of the invention.
Figure 4B:
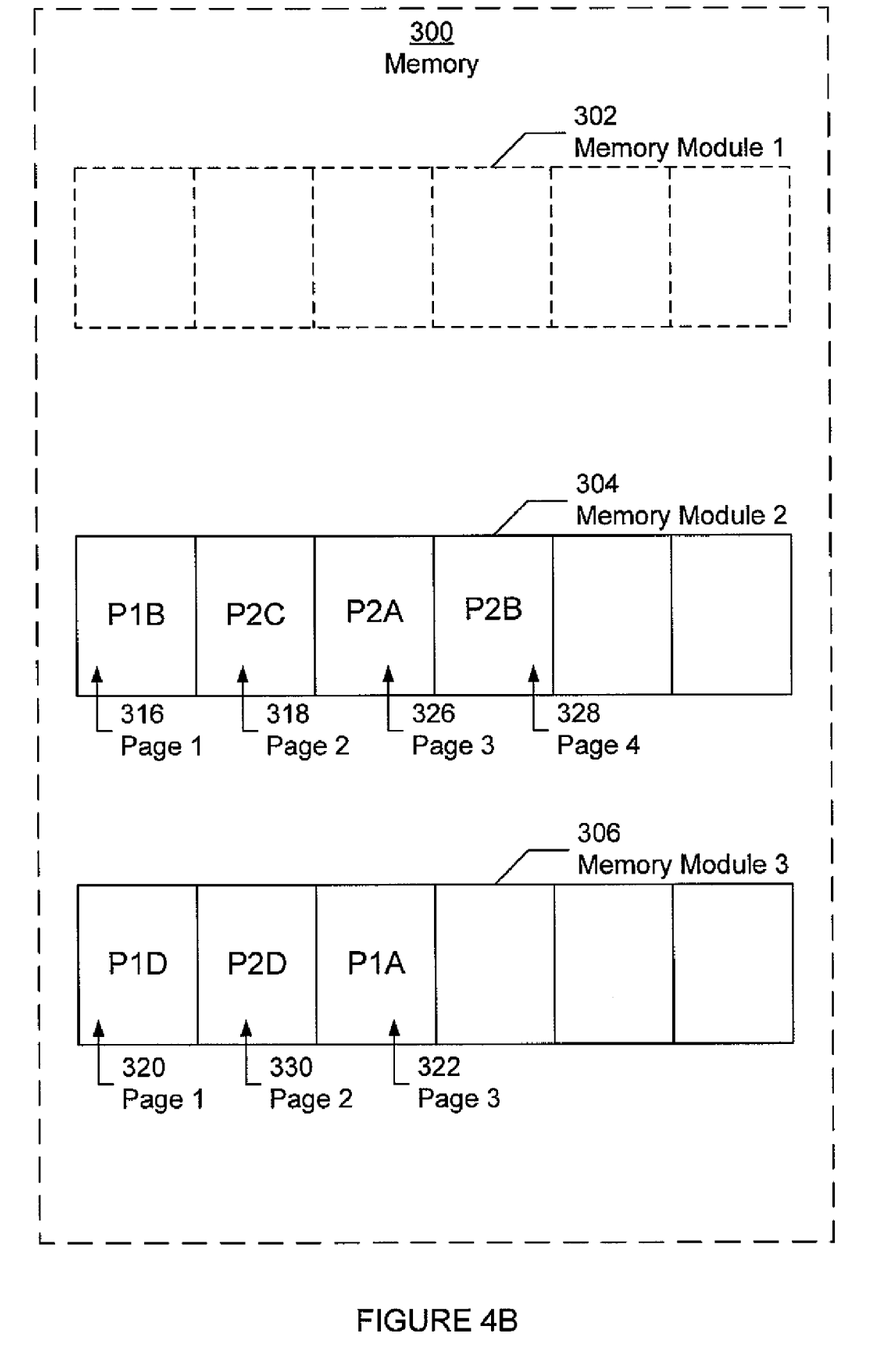

FIGS. 4A-4B show example memory in accordance with one or more embodiments of the invention. FIGS. 4A-4B are merely exemplary and not intended to limit the scope of the invention.

In the following example, consider the scenario in which two processes (P1 and P2) are executing on the computer system having three memory modules. FIG. 4A, shows an example of allocation of pages of memory (300) to the memory modules under the first memory power management policy.

As shown in FIG. 4A, under the first memory power management policy, all memory modules (e.g., memory module 1 (302), memory module 2 (304), memory module 3 (306)) are enabled and have memory allocated to the processes. For example, the first memory power management policy may occur when performance is to be given a greater weight than power conservation. Thus, as shown in FIG. 4A, Process 1 is allocated page 3 (310) on memory module 1 (302) and page 1 (316, 320) on both memory module 2 (304) and memory module 3 (306). Further, process 2 is allocated page 4 (312) and page 6 (314) on memory module 1 (302), page 2 (318) on memory module 2 (304), and page 3 (322) on memory module 3 (306).

Next, consider the scenario in which while executing the two processes (P1 and P2), a new memory power management policy is to applied. For example, at night, a determination may be made that maintaining high performance is not as important as conserving power. In the example scenario, a user may set a schedule that from 7:00 PM to 7:00 AM, a memory power management policy that conserves power should be applied. At 7:00 PM, the computer system may switch to the new memory power management policy.

FIG. 4B shows example configuration of memory that may be created when the new memory power management policy is effective. As shown in FIG. 4B, the new memory power management policy may require the disabling of one of the memory modules (i.e., memory module 1 (302) (as shown by the dotted lines)). Further, a determination may be made to coalesce memory on memory module 2 (304) and memory module 3 (306). Additionally, the determination may be made to migrate data from memory module 1 (302) to memory modules 2 (304) and memory module 3 (306) when the computer system switches to the new memory power management policy. Thus, as shown in FIG. 4B, data (identified by P2D) in page 3 (322) of memory module 3 (306) is moved to page 2 (330) of memory module 3 (306). Further, data (identified by P1A) in page 3 (310) of memory module 1 (302) is moved to page 3 (322) of memory module 3 (306). Additionally, data (identified by P2A and P2B) in page 4 (312) and page 6 (314), respectively, of memory module 1 (302) is moved to page 3 (326) and page 4 (328), respectively, of memory module 2 (304). Thus, when all data is migrated, power to memory module 1 may cease (302). Accordingly, power is conserved during the time memory module 1 (302) is disabled. As shown in the example, embodiments of the invention allow the user to control the balance between performance and amount of energy used by memory.

While the example shows the memory modules as having the same number of pages and each page having a fixed size, one skilled in the art will appreciate that each memory module may have various sized page and/or number of pages without departing from the scope of the invention. Further, the exact allocation of space to the memory modules may be dependent on both the memory power management policy and the replacement algorithm implemented by the computer system.

Figure 5:
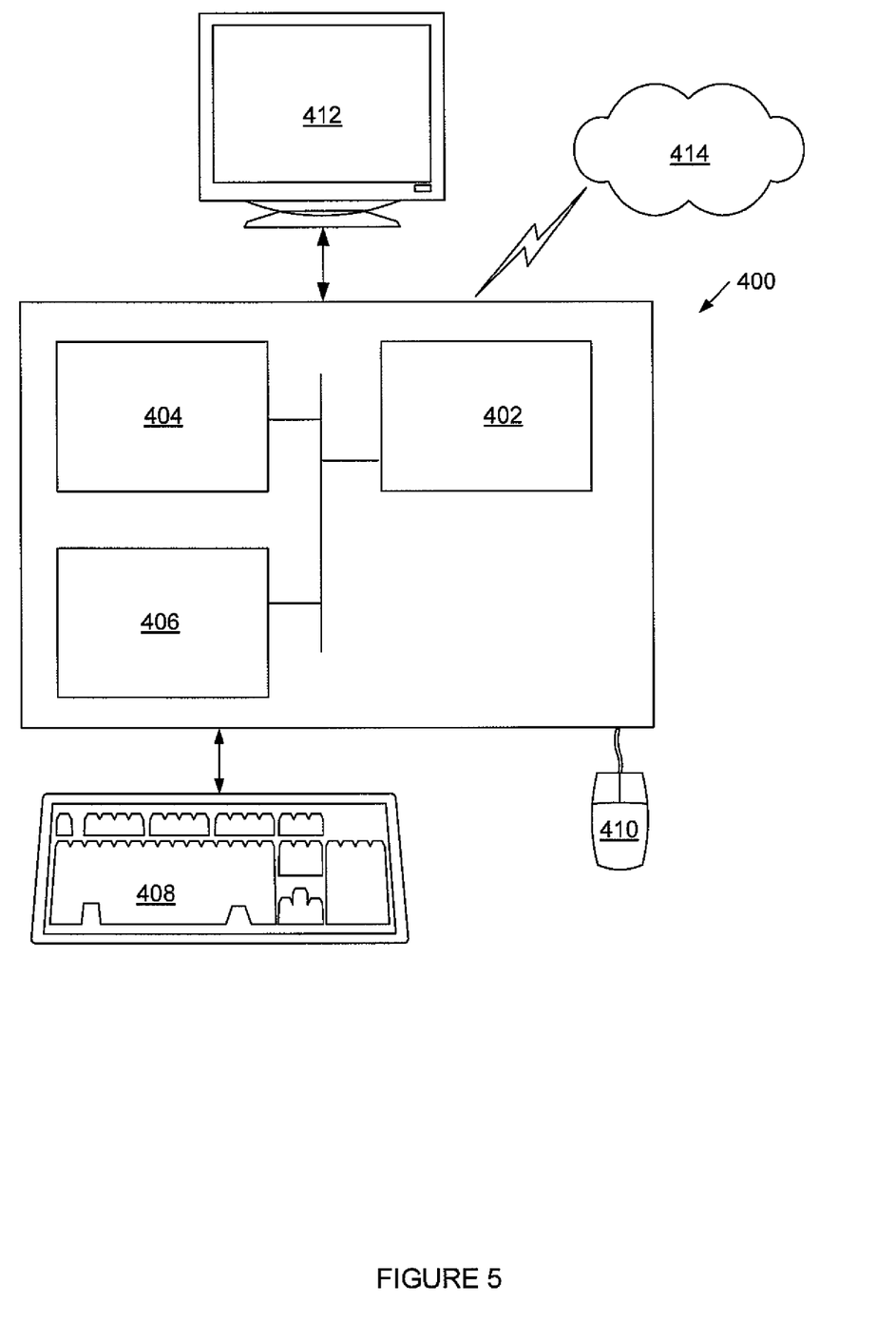
FIG. 5 shows a computer system in accordance with one or more embodiments of the invention.

The invention may be implemented on virtually any type of computer regardless of the platform being used. For example, as shown in FIG. 5, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (414) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (erg., page allocator, MMU, memory) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for memory management comprising:
   receiving a first request for a first memory space;
   identifying a first memory power management policy as a current memory power management policy, wherein the first memory power management policy specifies how to allocate memory space in the plurality of memory modules to satisfy a power consumption criteria;
   selecting, for the first request, a first memory module from a plurality of memory modules according to the first memory power management policy, wherein the plurality of memory modules comprises a first memory module and a second memory module as enabled when the first memory power management policy is the current memory power management policy;
   allocating, based on the selection for the first request, the first memory space on the first memory module;

changing, based on a schedule and a current time of day, the current memory power management policy from the first memory power management policy to a second memory power management policy, wherein the schedule defines a first time of day to switch to the second memory power management policy and a second time of day to switch to the first memory power management policy;

migrating pages stored on the first memory module to the second memory module;

disabling the first memory module according to the second memory power management policy;

receiving a second request for a second memory space;

selecting, for the second request and based on the second memory power management policy being the current memory power management policy, the second memory module from the plurality of memory modules;

allocating the second memory space to the second memory module;

monitoring memory performance when the second memory power management policy is the current memory power management policy;

triggering, prior to the second time of day, an event to switch to the first memory power management policy based on the memory performance failing to comply with memory performance criteria;

switching, based on the event, to the first memory power management policy prior to the second time of day; and re-enabling, prior to the second time of day, the first memory module based on switching to the first memory power management policy.

2. The method of claim 1, wherein the memory performance criteria specifies at least one selected from a group consisting of a maximum latency and a maximum bandwidth utilization of the first memory module.

3. The method of claim 1, wherein changing the current memory power management policy from the first memory power management policy to the second memory power management policy is triggered by a change in a value of an Mstate variable.

4. A system for memory management comprising:
a plurality of memory modules; and
a page allocator configured to:
  receive a first request for a first memory space;
  identify a first memory power management policy as a current memory power management policy, wherein the first memory power management policy specifies how to allocate memory space in the plurality of memory modules to satisfy a power consumption criteria;
  select, for the first request, a first memory module from the plurality of memory modules according to the first memory power management policy, wherein the plurality of memory modules comprises a first memory module and a second memory module as enabled when the first memory power management policy is the current memory power management policy;
  allocate, based on the selection for the first request, the first memory space on the first memory module;
  migrate, based on a change of the current memory power management policy from the first memory power management policy to the second memory power management policy, pages stored on the first memory module to the second memory module,
    wherein the change is based on a schedule and a current time of day, wherein the schedule defines a first time of day to switch to the second memory power management policy and a second time of day to switch to the first memory power management policy,
    wherein memory performance is monitored when the second memory power management policy is the current memory power management policy;
  disable the first memory module according to the second memory power management policy;
  receive a second request for a second memory space;
  select, for the second request and based on the second memory power management policy being the current memory power management policy, the second memory module from the plurality of memory modules;
  allocate the second memory space to the second memory module;
  receive, prior to the second time of day, an event to switch to the first memory power management policy based on the memory performance failing to comply with memory performance criteria; and
  re-enable, prior to the second time of day, the first memory module based on switching to the first memory power management policy.

5. The system of claim 4, wherein the memory performance criteria specifies at least one selected from a group consisting of a maximum latency and a maximum bandwidth utilization of the first memory module.

6. The system of claim 4, wherein changing the current memory power management policy from the first memory power management policy to the second memory power management policy is triggered by a change in a value of an Mstate variable.

7. The system of claim 4, wherein the event is triggered by a schedule defining a time of day in which to implement the second memory power management policy.

8. A non-transitory computer readable medium comprising computer readable program code embodied therein for causing a computer system to:
  receive a first request for a first memory space;
  identify a first memory power management policy as a current memory power management policy, wherein the first memory power management policy specifies how to allocate memory space in the plurality of memory modules to satisfy a power consumption criteria;
  select, for the first request, a first memory module from a plurality of memory modules according to the first memory power management policy, wherein the plurality of memory modules comprises a first memory module and a second memory module as enabled when the first memory power management policy is the current memory power management policy;
  allocate, based on the selection for the first request, the first memory space on the first memory module;
  change, based on a schedule and a current time of day, the current memory power management policy from the first memory power management policy to a second memory power management policy, wherein the schedule defines a first time of day to switch to the second memory power management policy and a second time of day to switch to the first memory power management policy;
  migrate pages stored on the first memory module to the second memory module;
  disable the first memory module according to the second memory power management policy;
  receive a second request for a second memory space;
  select, for the second request and based on the second memory power management policy being the current memory power management policy, the second memory module from the plurality of memory modules;
allocate the second memory space to the second memory module;
monitor memory performance when the second memory power management policy is the current memory power management policy;
trigger, prior to the second time of day, an event to switch to the first memory power management policy based on the memory performance failing to comply with memory performance criteria;
switch, based on the event, to the first memory power management policy prior to the second time of day; and
re-enable, prior to the second time of day, the first memory module based on switching to the first memory power management policy.

9. The non-transitory computer readable medium of claim 8, wherein changing the current memory power management policy from the first memory power management policy to the second memory power management policy is triggered by a change in a value of an Mstate variable.

10. The method of claim 1, further comprising:
migrating a portion of pages stored on the second memory module to the first memory module based on the re-enabling of the first memory module.

11. The system of claim 4, wherein the page allocator is further configured to:
migrate a portion of pages stored on the second memory module to the first memory module based on the re-enabling of the first memory module.

12. The non-transitory computer readable medium of claim 8, wherein the computer readable program code further causes the computer system to:
migrate a portion of pages stored on the second memory module to the first memory module based on the re-enabling of the first memory module.

* * * * *